(12) United States Patent
Chacko et al.

(10) Patent No.: US 10,074,490 B2
(45) Date of Patent: Sep. 11, 2018

(54) HYBRID CAPACITOR WITH ENHANCED RELIABILITY

(71) Applicant: KEMET Electronics Corporation, Simpsonville, SC (US)

(72) Inventors: Antony P. Chacko, Simpsonville, SC (US); Liancai Ning, Jiangsu (CN); Yaru Shi, Simpsonville, SC (US); Qingping Chen, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 179 days.

(21) Appl. No.: 15/013,307

(22) Filed: Feb. 2, 2016

(65) Prior Publication Data

US 2016/0240323 A1 Aug. 18, 2016

Related U.S. Application Data

(60) Provisional application No. 62/116,043, filed on Feb. 13, 2015.

(51) Int. Cl.
| | |
|---|---|
| *H01G 9/15* | (2006.01) |
| *H01G 11/04* | (2013.01) |
| *H01G 11/58* | (2013.01) |
| *H01G 11/56* | (2013.01) |
| *H01G 11/30* | (2013.01) |

(52) U.S. Cl.
CPC ............ *H01G 11/04* (2013.01); *H01G 9/15* (2013.01); *H01G 11/30* (2013.01); *H01G 11/56* (2013.01); *H01G 11/58* (2013.01)

(58) Field of Classification Search
None
See application file for complete search history.

(56) References Cited

U.S. PATENT DOCUMENTS

| | | | |
|---|---|---|---|
| 7,497,879 B2 | 3/2009 | Kakuma et al. | |
| 2005/0141173 A1* | 6/2005 | Tseng ................ | H01G 9/025 361/525 |
| 2011/0149476 A1* | 6/2011 | Saida ................. | H01G 9/012 361/525 |
| 2013/0279079 A1* | 10/2013 | Merker .............. | H01G 9/0029 361/528 |
| 2013/0279080 A1* | 10/2013 | Aoyama ............ | H01G 9/008 361/534 |

FOREIGN PATENT DOCUMENTS

WO WO 2012041506 4/2012

* cited by examiner

*Primary Examiner* — Dion R Ferguson
(74) *Attorney, Agent, or Firm* — Joseph T. Guy; Patent Filing Specialist, Inc.

(57) ABSTRACT

An improved hybrid capacitor is described. The hybrid capacitor comprises an anode with a dielectric thereon and a cathode. An electrolyte is in electrical contact with the cathode and between the cathode and the dielectric. The electrolyte comprises a solid electrolyte coated on the cathode and an impregnating electrolyte wherein the solid electrolyte and the impregnating electrolyte have an intermolecular bond there between.

129 Claims, 4 Drawing Sheets

HYBRID CAPACITOR WITH ENHANCED RELIABILITY

CROSS-REFERENCE TO RELATED APPLICATIONS

The present invention claims priority to U.S. Pat. Appl. No. 62/116,043 filed Feb. 13, 2015 which is incorporated herein by reference.

BACKGROUND

The present invention is related to an improved method of forming an electrolytic capacitor and an electronic capacitor formed thereby. More specifically, the present invention is related to a hybrid capacitor with improved reliability.

Hybrid capacitors are a combination of solid electrolyte technology and wet electrolytic technology. Polymer hybrid capacitors use a combination of a liquid and conductive polymer to serve as the electrolyte. The polymer offers high conductivity and a correspondingly low ESR. The liquid portion of the electrolyte, meanwhile, can withstand high voltages and provide higher capacitance ratings due to a large effective surface area.

Hybrid electrolytic capacitors offer several advantages over purely wet or purely solid electrolytic capacitors. Hybrid capacitors have significantly better endurance and humidity resistance than either their wet electrolyte or polymeric electrolyte counterparts. Hybrids also have significantly higher tolerance for large ripple currents. However, due to the presence of the liquid electrolyte hybrid capacitors have a limited life and poor reliability, particularly, at higher temperatures such as 150° C. and above. The limited life and poor reliability has restricted the utility of hybrid capacitors particularly since their use has been reduced to those applications which have minimal risk of high temperature excursions.

U.S. Pat. No. 7,497,879, which his incorporated herein by reference, describes a method of manufacturing a hybrid electrolytic capacitor including impregnating the separator of a pre-wound capacitor body with a dispersion containing a solvent and electrically conductive solid particles or powder. The solvent is removed by evaporation thereby forming an electrically conductive solid layer on a surface of the dielectric coating film. The electrically conductive solid layer is then impregnated with a liquid electrolyte solution.

WO 2012041506, which is incorporated herein by reference, introduces a dispersion comprising a dispersing agent and particles of an electrically conductive polymer with a particle size ($d_{50}$) of 70 nm or less. After at least partial removal of the dispersing agent the electrically conductive polymer is impregnated with a liquid electrolyte comprising polyalkylene glycol, polyalkylene glycol derivative, or combinations thereof.

In spite of the efforts of those of skill in the art the reliability, and temperature stability, have only marginally improved. The liquid components of the liquid electrolyte are still susceptible to evaporation at the operating temperatures a capacitor is reasonably expected to experience during normal use or during the manufacturing and assembly process. There is still a significant desire for a hybrid capacitor, with the advantages offered thereby, which is stable at elevated temperatures. Such a hybrid capacitor is provided herein.

SUMMARY

It is an object of the invention to provide an improved hybrid electrolytic capacitor comprising a solid conductive polymer electrolyte with an impregnating electrolyte therein.

It is another object of the invention to provide an improved method of preparing a hybrid capacitor by forming intermolecular bonds between the solid electrolyte and impregnating electrolyte.

It is another object of the invention to provide an improved method of retaining impregnating electrolyte in hybrid capacitors.

It is another object of the invention to provide an improved method of preparing hybrid capacitors with higher temperature stability.

It is another object of the invention to provide an improved method of preparing hybrid capacitors comprising fibers in the solid electrolyte.

These, and other advantages, as will be realized, are provided in a hybrid capacitor. The hybrid capacitor comprises an anode with a dielectric thereon and a cathode. An electrolyte is in electrical contact with the cathode and between the cathode and the dielectric. The electrolyte comprises a solid electrolyte coated on the cathode and an impregnating electrolyte wherein the solid electrolyte and the impregnating electrolyte have an intermolecular bond there between.

Yet another embodiment is provided in a method of forming a hybrid capacitor. The method includes:
forming a dielectric on an anode foil;
forming a wound electrolytic capacitor comprising alternating layers of the anode foil, a cathode foil and a separator between the anode foil and the cathode foil;
forming a solid electrolyte layer on the cathode;
impregnating the solid electrolyte layer with an impregnating electrolyte; and
forming an intermolecular bond between the impregnating electrolyte and the solid electrolyte layer.

Yet another embodiment is provided in a method of forming a hybrid capacitor. The method includes:
forming a dielectric on an anode;
forming a solid electrolyte layer on the dielectric;
impregnating the solid electrolyte layer with an impregnating electrolyte forming an impregnated solid electrolyte;
forming a cathode on the impregnated solid electrolyte; and
forming an intermolecular bond between the impregnating electrolyte and the solid electrolyte layer.

DESCRIPTION

The present invention is related to an improved hybrid capacitor and a method for making an improved hybrid capacitor. More particularly, the present invention is related to an improved hybrid capacitor, and method of making an improved hybrid capacitor having intermolecular bonds between the solid electrolyte and impregnating electrolyte.

The durability of hybrid capacitors is improved herein by enhancing the film integrity thereby improving the interaction of impregnating electrolyte with the solid electrolyte by forming intermolecular bonds between reactive groups of the solid electrolyte and reactive groups of the impregnating electrolyte. The intermolecular bonds can be formed by in-situ reaction of the solid electrolyte reactive groups and the impregnating electrolyte reactive groups. An intermolecular bond is either an ionic bond or a covalent bond and preferably a covalent bond.

The invention will be described with reference to the figures which are an integral non-limiting component of the disclosure. Throughout the various figures similar elements will be numbered accordingly.

Figure 1:
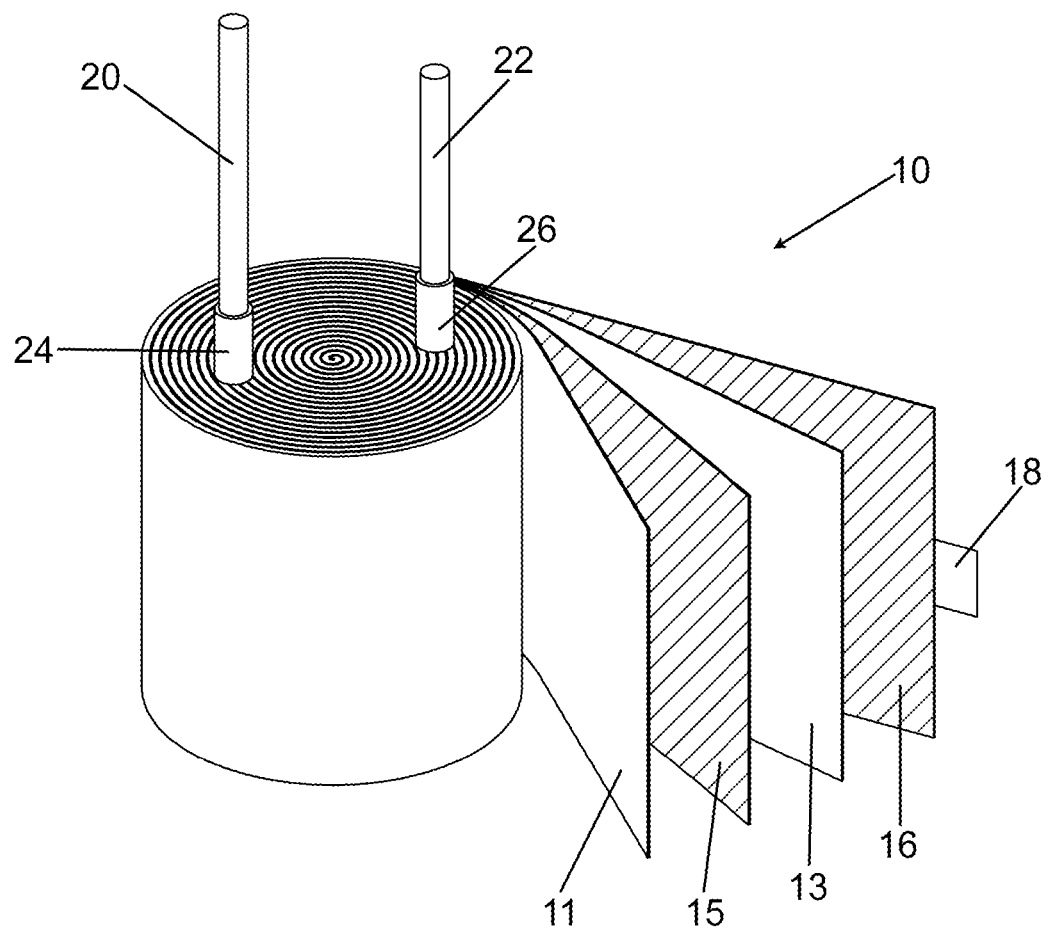
FIG. 1 is a schematic representation of a partially wound embodiment of the invention.

An embodiment of the invention will be described with reference to FIG. 1 wherein a partially wound hybrid capacitor is illustrated schematically. In FIG. 1, the capacitor, generally represented at 10, comprises an anode foil, 11, with a formed dielectric thereon. A formed dielectric is defined herein as a thicker dielectric than native dielectric typically present from ambient oxidation. The cathode foil, 13, is separated from the anode foil by separators, 15 and 16, wherein the separator is a porous lattice with electrolyte extending there through wherein the electrolyte comprises an impregnated solid electrolyte comprising a solid electrolyte and an impregnating electrolyte in electrical contact with the cathode foil. A closure, 18, such as an adhesive strip or the like, maintains the wound capacitor in the wound state for preparation of the electrolyte and assembly. Leads, 20 and 22, extending through tabs, 24 and 26, are separately in electrical contact with the anode foil and cathode foil.

Figure 2:
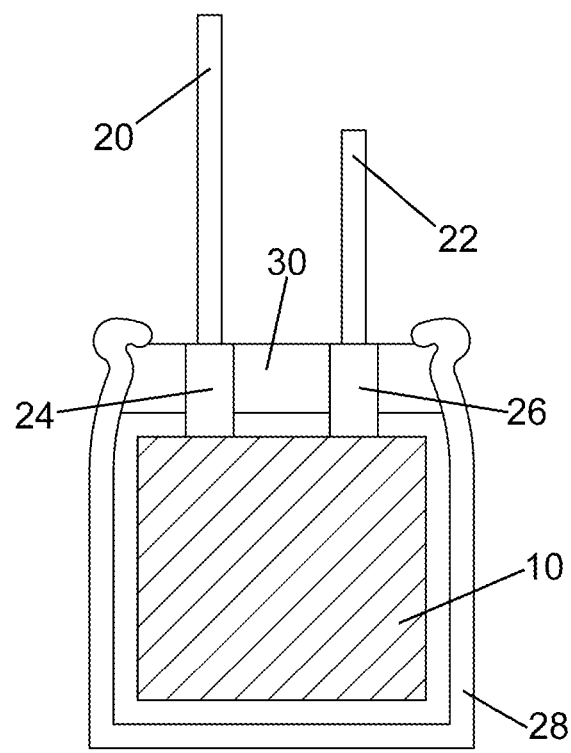
FIG. 2 is a schematic cross-sectional view of an embodiment of the invention

An embodiment of an assembled hybrid capacitor is illustrated in cross-sectional schematic view in FIG. 2. In FIG. 2, the capacitor, 10, is within a container, 28, which may be sealed, optionally hermetically, by a sealant, 30, such as resin material, particularly an epoxy resin or a rubber material such as EPT and IIR. The tabs, 24 and 26, extend through the sealant thereby providing access to the leads, 20 and 22, which are ultimately attached to a circuit as would be understood to those of skill in the art.

Figure 3:
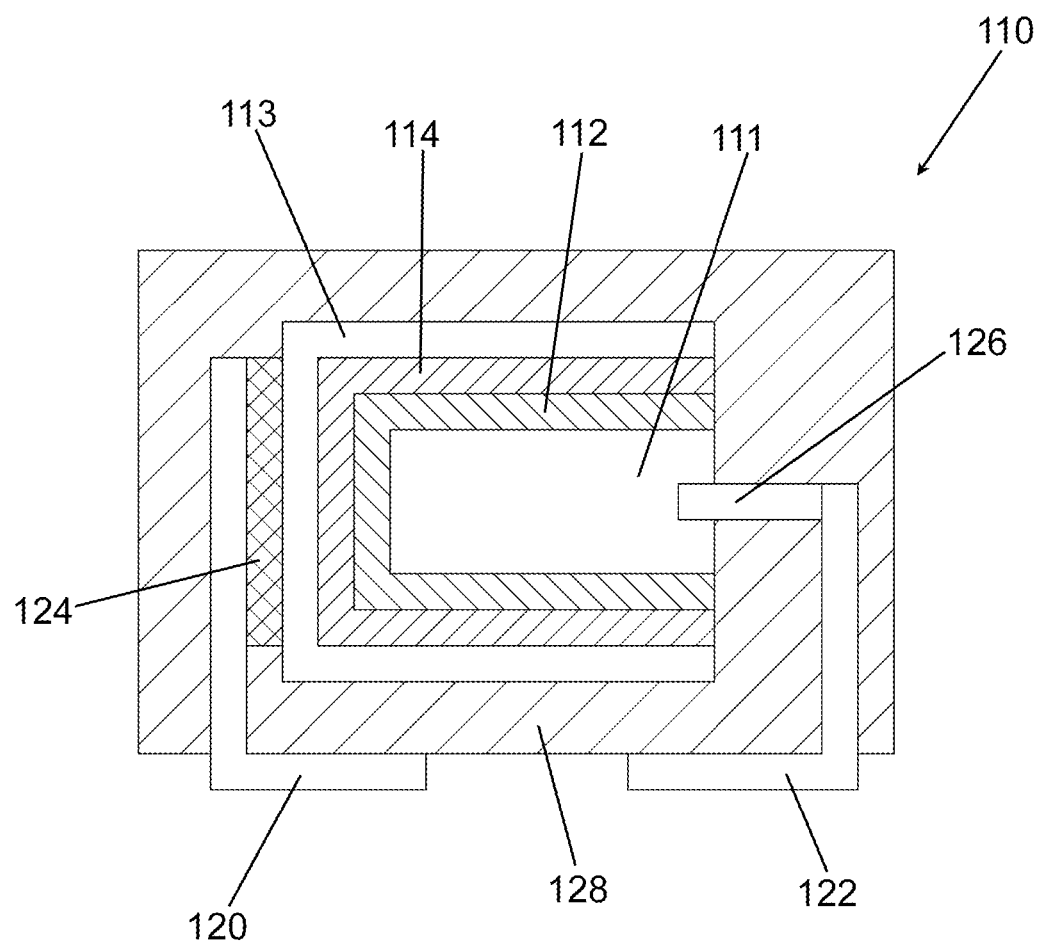
FIG. 3 is a schematic cross-sectional view of an embodiment of the invention.

An embodiment of the invention is illustrated in cross-sectional schematic view in FIG. 3. In FIG. 3, a capacitor, generally represented at 110, comprises an anode, 111, with a dielectric, 112, at least partially encasing the anode. The hybrid electrolyte, 114, is between the dielectric and cathode, 113, wherein the hybrid electrolyte is an impregnated solid electrolyte comprising a solid electrolyte, as described herein, and an impregnating electrolyte, as also described herein. The solid electrolyte can be impregnated with the impregnating electrolyte before formation of subsequent layers or after formation of subsequent layers. The cathode preferably comprises at least one carbon containing layer, to allow adhesion to the hybrid electrolyte, and a metal layer allowing adhesion to a cathode lead, 120, such as by an adhesive, 124, which may be a conductive adhesive, a weld, a solder, a transient liquid phase sintering adhesive, a polymer solder or the like. An anode wire, 126, is in electrical contact with the anode and allows electrical connection to an anode lead, 122. The entire assembly, except for a portion of the anode lead and cathode lead, is preferably encased in a non-conductive resin, 128, as known in the art.

Figure 4:
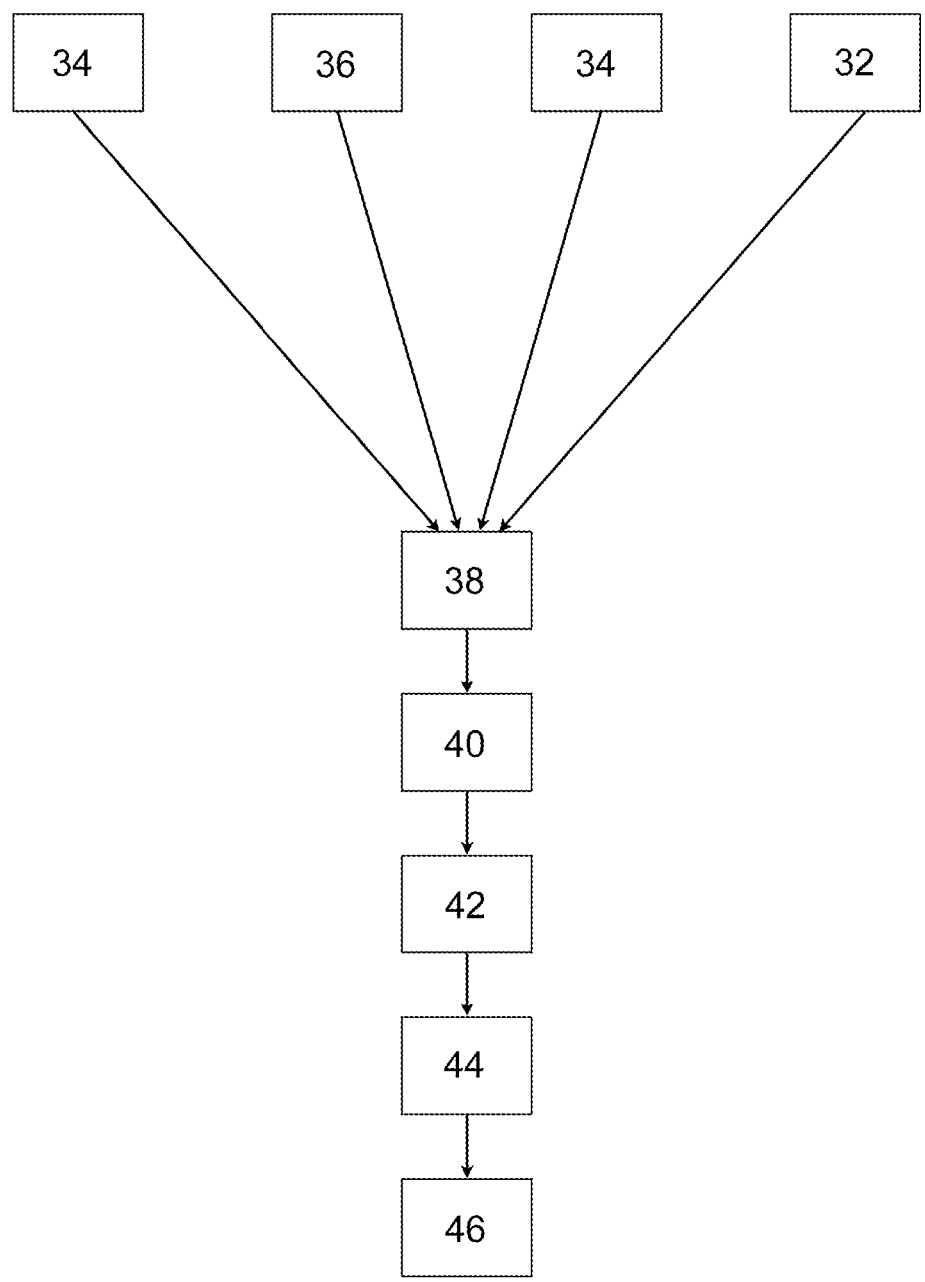
FIG. 4 is a flow-chart representation of an embodiment of the invention.

An embodiment of the invention will be described with reference to FIG. 4 wherein the invention is illustrated as a flow-chart. In FIG. 4, an anode foil comprising a dielectric thereon is provided at 32, separator is provided at 34 and a cathode foil is provided at 36. The anode foil, cathode foil and separator are wound at 38, and secured, wherein the cathode foil and anode foil are separated by the separator thereby forming a wound capacitor precursor with leads separately attached to the cathode foil and anode foil. A solid electrolyte is formed on the cathode at 40 wherein the solid electrolyte comprises at least one of manganese dioxide and a conductive polymer with optional additives as further described herein. The solid electrolyte can be formed by in-situ polymerization wherein monomers are polymerized on the cathode foil by electrochemical or chemical polymerization. More preferably, the solid electrolyte is formed from a dispersion, such as by dipping the wound capacitor precursor into the dispersion, wherein the dispersion comprises either manganese dioxide or a preformed polymer. After formation of the solid electrolyte it is preferable to at least partially remove the solvent. The impregnating electrolyte is introduced at 42 wherein the impregnating electrolyte flows throughout the area between the cathode and dielectric on the anode. A reactive group of the solid electrolyte is cross-linked with a reactive group of the impregnating electrolyte at 44 thereby forming a hybrid capacitor preferably by increasing the temperature to at least 100° C. The hybrid capacitor is preferably finished at 46 including packaging in a container, sealing the container, and optionally testing.

The anode is a conductor, preferably a metal, and more preferably a valve metal, with a dielectric thereon. The anode is in the form of a monolith formed of pressed powder or in the form of a foil. While not limited thereto the dielectric is preferably an oxide of the anode metal. Particularly preferred anodes are selected from the group consisting of tantalum, aluminum, niobium, titanium, zirconium, hafnium, alloys of these elements and conductive oxides thereof such as NbO.

The dielectric is a non-conductive layer which is not particularly limited herein. The dielectric may be a metal oxide or a ceramic material. A particularly preferred dielectric is the oxide of the anode material due to the simplicity of formation and ease of use. The dielectric layer is preferably an oxide of a valve metal as further described herein. The dielectric is preferably formed by dipping the anode into an electrolyte solution, referred to as a forming electrolyte, and applying a positive voltage to the anode. Forming electrolytes for the oxide formation are not particularly limited herein but exemplary materials can include ethylene glycol; polyethylene glycol dimethyl ether as described in U.S. Pat. No. 5,716,511; alkanolamines and phosphoric acid, as described in U.S. Pat. No. 6,480,371; polar aprotic solvent solutions of phosphoric acid as described in U.K. Pat. No. GB 2,168,383 and U.S. Pat. No. 5,185,075; complexes of polar aprotic solvents with protonated amines as described in U.S. Pat. No. 4,812,951 or the like. Electrolytes for formation of the dielectric on the anode including aqueous solutions of dicarboxylic acids, such as ammonium adipate, are also known. Other materials may be incorporated into the dielectric such as phosphates, citrates, etc. to impart thermal stability or chemical or hydration resistance.

The cathode is not particularly limited herein and may be in the form of a meal foil or a metal coating in some embodiments. Metals are preferable and, in one embodiment, the cathode foil may comprise the same material as the anode foil except the cathode preferably lacks formed dielectric.

The separator is not particularly limited herein. Exemplary materials for demonstration of the invention include nonwoven fabric containing cellulose, kraft, polyethylene terephthalate, polybutylene terephthalate, polyphenylene sulfide, nylon, aromatic polyamide, polyimide, polyamide-imide, polyether imide, rayon, glass and the like.

The electrolyte comprises a solid electrolyte, preferably selected from manganese dioxide and conductive polymer, and an impregnating electrolyte impregnating the solid electrolyte. A particularly preferred conductive polymer is selected from polythiophene, polyaniline, polypyrrole or their derivatives.

A particularly preferred conducting polymer is illustrated in Formula I:

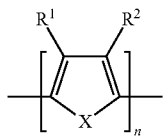

FORMULA 1

$R^1$ and $R^2$ of Formula 1 are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups are small to avoid steric interferences. For these reasons $R^1$ and $R^2$ taken together as —O—$(CH_2)_2$—O— is most preferred.

In Formula 1, X is S or N and most preferable X is S.

$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl.

The conducting polymer is preferably chosen from polypyrroles, polyanilines, polythiophenes and polymers comprising repeating units of Formula I, particularly in combination with organic sulfonates. A particularly preferred polymer is 3,4-polyethylene dioxythiophene (PEDT).

The conducting polymer dispersion preferably comprises polymers with a particle size of no more than 100 nm. Above about 100 nm the film formed on the cathode is not adequate. It is preferable that the particles have a particle size of at least 0.5 nm. Below about 0.5 nm the particles have the potential of entering the interstitial surface into regions of poor dielectric. The particle size is preferably at least 5 to no more than 20 nm.

The solid electrolyte preferable includes at least one additive selected from fibers, dopants, crosslinkers, binders and nanoparticles wherein the additive comprises the reactive group of the solid electrolyte.

Particularly preferred nanoparticles are functionalized nanoparticles wherein the surface of the nanoparticles has been derivatized to include reactive groups.

The solid electrolyte may include fibers suitable for facilitating absorption of the impregnating electrolyte. Particularly suitable fibers are fibers and nanofibers prepared from polymers such as polyacrylonitrile, cellulose, polyethylene oxide, polymethylmethacrylate, polyamide, polyaniline, polyvinyl alcohol, nanofibers derived from cellulose, nanofibers electrolspun from conducting polymers such as polyaniline, polythiophene, polypyrrole, etc. Fibers with a length of no more than 100 nm and diameter of no more than 50 nm are preferred. Microfibers or nanofibers prepared by milling can also be used. Hollow fibers and fibers with higher electrolyte absorption properties are preferred.

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy groups, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121, which is included herein by reference thereto. In one embodiment the dopants comprise a solid electrolyte reactive group.

Binders can be also incorporated into the conductive polymer layer if desired. Suitable binders include poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers. In one embodiment the binder comprises a solid electrolyte reactive group.

The conductive polymer, binder, dopants or other components of the solid electrolyte comprise reactive groups such as epoxy, hydroxyl, amino, carboxylic, urethane, phosphate, silane, isocyanate, cyanate, nitro, peroxy, phosphio, phosphono, sulfonic acid, sulfone, nitro, acrylate, imide, amide, carboxyl, carboxylic anhydride, silane, oxazoline, (meth)acrylates, vinyls, maleates and maleimides itaconates, allyl alcohol esters, dicyclo-pentadiene-based unsaturations, unsaturated $C_{12}$-$C_{22}$ fatty esters or amides, carboxylic acid salts or quaternary ammonium salts which can be crosslinked with reactive groups on the impregnating electrolyte. The impregnating electrolyte comprises electrolytes solvents, anions, electrolytes and other additives with reactive groups such as epoxy, hydroxyl, amino, carboxylic, urethane, phosphate, silane, isocyanate, cyanate, nitro, peroxy, phosphio, phosphono, sulfonic acid, sulfone, nitro, acrylate, imide, amide, carboxyl, carboxylic anhydride, silane, oxazoline, (meth)acrylates, vinyls, maleates and maleimides itaconates, allyl alcohol esters, dicyclo-pentadiene-based unsaturations, unsaturated $C_{12}$-$C_{22}$ fatty esters or amides, carboxylic acid salts or quaternary ammonium salts which can be crosslinked with the reactive groups of the solid electrolyte. By crosslinking the impregnating electrolyte with the solid electrolyte the electrolyte of the impregnating electrolyte is still mobile yet the other components of the impregnating electrolyte are more difficult to remove from the electrolyte thereby increasing the performance in higher temperatures.

At least one component of the impregnating electrolyte comprises components with reactive groups otherwise, any conventionally known electrolytic solution may be employed. Preferably, however, an impregnating electrolytic comprises solvents, such as non-aqueous solvents or aprotic solvents, an organic salt, cations, anions, electrolytes and other compounds. Particularly preferred additives for the impregnating electrolyte include ethers, amides, oxazolidinones, nitriles, glycols, glymes, glycerols, lactones, carbonates, sulfones or polyols.

In the impregnating electrolyte the organic salt refers to a salt in which at least one of the base and the acid that are constituent elements of the salt is organic. Gamma-butyrolactone or sulfolane, or a mixture thereof, are particularly suitable non-aqueous solvents with high reliability and a low specific resistance. Organic amine salts are suitable for demonstration of the invention. Organic amine salt refers to a salt of an organic amine and an organic or inorganic acid. Among organic amine salts, a salt of an organic amine and an organic acid is preferably used, and examples thereof include, triethylamine borodisalicylate, ethyldimethylamine phthalate, mono 1,2,3,4-tetramethylimidazolinium phthalate, mono 1,3-dimethyl-2-ethylimidazolinium phthalate, and a mixture of them.

Particularly preferred additives for the impregnating electrolyte include polyols, glycerines, polyethylene glycols, poly(ethylene glycol) diacrylates, tetramethyl ammonium phthalates, γ-butyrolactones, ethylated γ-butyrolactones, propylated γ-butyrolactones, and β-propiolactones, dimethoxyethanes (DME), diglymes (diethylene glycol dimethyl ethers), triglymes (triethylene glycol dimethyl ethers), ethylene glycol diethyl ethers (DEE), and diethylene glycol diethyl ethers, polyethylene glycol dimethyl ethers, and at least one other organic solvent. Other additives include hyperbranched polyglycidol, hyperbranched polyalkylene glycols, poly(allyl glycidyl ether), poly(ethoxy ethyl glycidyl ether), copolymers of methyl glycidyl ether and allyl glycidyl ether, copolymers of methyl glycidyl ether and n-butyl glycidyl ether, hyperbranched copolymers comprising polymerizing glycidol of glycidyl ether monomer such as methyl glycidyl ether, poly(ethylene glycol) methyl ether acrylate, methoxypolyethylene glycol amine, O-(carboxymethyl)-O'-methylpolyethylene glycol, methoxy poly(ethylene glycol), polyethylene glycol monomethyl ether, methoxypolyethylene glycol maleimide, and poly(ethylene glycol) methyl ether methacrylate.

Exemplary aprotic solvents in the impregnating electrolyte include: ethers, amides, oxazolidinones, lactones, nitriles, carbonates, sulfones, and other organic solvents. Exemplary ethers include: monoethers, such as ethylene glycol monobutyl ether, ethylene glycol monophenyl ether, tetrahydrofuran, and 3-methyltetrahydrofuran, etc.; diethers, such as ethylene glycol dimethyl ether, ethylene glycol diethyl ether, diethylene glycol monomethyl ether, and diethylene glycol monoethyl ether, etc.; and triethers, such as diethylene glycol dimethyl ether, and diethylene glycol diethyl ether, etc. Examples amides include: formamides, such as N-methylformamide, N,N-dimethylformamide, N-ethylformamide, and N,N-diethylformamide, etc.; acetamides, such as N-methylacetamide, N,N-dimethylacetamide, N-ethylacetamide, and N,N-diethylacetamide, etc.; propionamides, such as N,N-dimethylpropionamide, etc.; pyrrolidones, such as N-methylpyrrolidone, and N-ethylpyrrolidone, etc.; and hexamethyl phosphoryl amide, etc. Examples oxazolidinones include N-methyl-2-oxazolidinone, 3,5-dimethyl-2-oxazolidinone, etc. Exemplary lactones include γ-butyrolactone, α-acetyl-γ-butyrolactone, β-butyrolactone, γ-valerolactone, and δ-valerolactone, etc. Exemplary nitriles include: acetonitrile, propionitrile, butyronitrile, acrylonitrile, methacrylonitrile, and benzonitrile, etc. Exemplary carbonates include: ethylene carbonate, propylene carbonate, butylene carbonate, dimethyl carbonate, and diethyl carbonate, etc. Exemplary sulfones include: sulfolane, and dimethyl sulfone, etc. Examples other organic solvents include: 1,3-dimethyl-2-imidazolidinone, dimethyl sulfoxide, aromatic solvents (toluene, xylene, etc.), and paraffin solvents (normal paraffin, isoparaffin, etc.), etc.

Aprotic solvents may be used alone or in combinations of two or more solvents in the impregnating electrolyte. Among them, lactone and sulfone are preferred, γ-butyrolactone and sulfolane are more preferred, and γ-butyrolactone is particularly preferred.

In one embodiment the solvent has a boiling point of higher than 200° C. and a dielectric constant of higher than 35.

The impregnating electrolyte preferably contains a cation represented by Formula II and an anion.

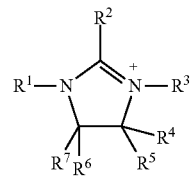

Formula II

In Formula II, $R^1$ to $R^3$ are each $C_{1-3}$ alkyl, and $R^4$ to $R^7$ are each $C_{1-3}$ alkyl or a hydrogen atom. Examples of the $C_{1-3}$ alkyl include: methyl, ethyl, n-propyl and isopropyl.

Exemplary cations include: 1,2,3,4-tetramethylimidazolinium, 1,3,4-trimethyl-2-ethylimidazolinium, 1,3-dimethyl-2,4-diethylimidazolinium, 1,2-dimethyl-3,4-diethylimidazolinium, 1-methyl-2,3,4-triethylimidazolinium, 1,2,3,4-tetraethyl-imidazolinium; 1,2,3-trimethylimidazolinium, 1,3-dimethyl-2-ethylimidazolinium; 1-ethyl-2,3-dimethylimidazolinium, and 1,2,3-triethylimidazolinium, etc. with 1,2,3,4-tetramethylimidazolinium and 1-ethyl-2,3-dimethylimidazolinium being more preferred.

Exemplary anions in the impregnating electrolyte include the anions of various organic acids and/or inorganic acids commonly used in electrolytic solutions. In the case of an organic acid and/or inorganic acid having a valence of two or more, the anion is preferably a monoanion.

The organic acid and inorganic acid are exemplified by carboxylic acids, phenols, mono- and di-alkyl phosphates containing $C_{1-15}$ alkyl, sulfonic acids, inorganic acids, and others. Exemplary carboxylic acids include: $C_{2-15}$ polycarboxylic acid having a valence of 2 to 4 including: aliphatic polycarboxylic acids, such as saturated polycarboxylic acids, particularly oxalic acid, malonic acid, succinic acid, glutaric acid, adipic acid, pimelic acid, superic acid, azelaic acid, and sebacic acid, etc., and unsaturated polycarboxylic acids particularly maleic acid, fumaric acid, and itaconic acid, etc., aromatic polycarboxylic acids, such as phthalic acid, isophthalic acid, terephthalic acid, trimellitic acid, and pyromellitic acid, etc.; and S-containing polycarboxylic acids, such as thiodipropionic acid, etc; $C_{2-20}$ hydroxycarboxylic acid including aliphatic hydroxycarboxylic acids, such as glycolic acid, lactic acid, tartaric acid, and castor oil fatty acid, etc.; aromatic hydroxycarboxylic acid, such as salicylic acid; and mandelic acid, etc; $C_{1-30}$ monocarboxylic acid including aliphatic monocarboxylic acids, such as saturated monocarboxylic acids including formic acid, acetic acid, propionic acid, butyric acid, isobutyric acid, valeric acid, caproic acid, enanthic acid, caprylic acid, pelargonic acid, ularic acid, myristic acid, stearic acid and behenic acid, etc.), unsaturated monocarboxylic acids such as acrylic acid, methacrylic acid, crotonic acid and oleic acid, etc.; and aromatic monocarboxylic acids, such as benzoic acid, cinnamic acid, and naphthoic acid, etc. Exemplary phenols include monohydric phenol including phenols and naphthols including phenol, $C_{1-15}$ alkyl phenols such as cresol, xylenol, ethylphenol, n- or isopropylphenol, and isododecylphenol, etc., methoxyphenols such as eugenol, and guaiacol, etc., α-naphthol, β-naphthol, and cyclohexylphenol, etc., polyhydric phenols including catechol, resorcin, pyrogallol, phloroglucin, bisphenol A, bisphenol F, and bisphenol S, etc. Exemplary Mono- and di-alkyl phosphates containing $C_{1-15}$ alkyl include mono- and di-methyl phosphates, mono- and di-ethyl phosphates, mono- and di-isopropyl phosphates, mono- and di-butyl phosphates, mono- and di-(2-ethylhexyl) phosphates, mono- and di-isodecyl phosphates, etc. Exemplary sulfonic acids include: $C_{1-15}$ alkyl benzenesulfonic acid such as p-toluenesulfonic acid, nonylbenzenesulfonic acid, and dodecylbenzenesulfonic acid, etc., sulfosalicylic acid, methanesulfonic acid, and trifluoromethanesulfonic acid, etc. Exemplary inorganic acids include: phosphoric acid, tetrafluoroboric acid, perchloric acid, hexafluorophosphoric acid, hexafluoroantimonic acid, and hexafluoroarsenic acid, etc. Other examples include imide anion of trifluoromethane sulfonylimide or the like, and methide anion of trifluoromethane sulfonylmethide or the like.

The electrolyte in the impregnating electrolyte is represented by a combination of the cation and the anion, preferably including one from the following: 1,2,3,4-tetramethylimidazolinium/phthalate monoanion, 1-ethyl-2,3-dimethylimidazolinium/phthalate monoanion, 1,2,3,4-tetramethylimidazolinium/maleate monoanion, 1-ethyl-2,3-dimethylimidazolinium cation/maleate monoanion, 1,2,3,4-tetramethylimidazolinium/diethylphosphate anion, 1-ethyl-2,3-dimethylimidazolinium cation/diethylphosphate anion, 1,2,3,4-tetramethylimidazolinium/dibutylphosphate anion, 1-ethyl-2,3-dimethylimidazolinium cation/dibutylphosphate anion, 1,2,3,4-tetramethylimidazolinium/diisopropylphosphate anion, and 1-ethyl-2,3-dimethylimidazolinium cation/diisopropylphosphate anion and most preferably selected from 1,2,3,4-tetramethylimidazolinium/phthalate monoanion, 1-ethyl-2,3-dimethylimidazolinium/phthalatemonoanion, 1,2,3,4-tetramethylimidazolinium/maleate monoanion, and 1-ethyl-2,3-dimethylimidazolinium cation/maleate monoanion.

The concentration of the organic salt in the non-aqueous solvent is not limited to a particular concentration, and a usually employed concentration may appropriately be employed. The concentration may be for example 5 to 50 wt %.

The crosslinker is a material which forms an intermolecular bond with, or by, the reactive group of the solid electrolyte with a reactive group of the impregnating electrolyte. Particularly preferred crosslinkers include silanes such as glycidyl silane and organofunctional silanes, epoxides, ethers such as glycidyl ether, epoxy crosslinkers and hydrophilic coupling agents.

Organofunctional silane is defined by the formula:

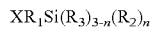

wherein X is an organic functional group such as amino, epoxy, anhydride, hydroxy, mercapto, sulfonate, carboxylate, phosphonate, halogen, vinyl, methacryloxy, ester, alkyl, etc; $R_1$ is an aryl or alkyl $(CH_2)_m$ wherein m can be 0 to 14; $R_2$ is individually a hydrolysable functional group such as alkoxy, acyloxy, halogen, amine or their hydrolyzed product; $R_3$ is individually an alkyl functional group of 1-6 carbons; n is 1 to 3.

The organofunctional silane can also be dipodal, define by the formula:

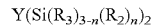

wherein Y is any organic moiety that contains reactive or nonreactive functional groups, such as alkyl, aryl, sulfide or melamine; $R_3$, $R_2$ and n are defined above. The organofunctional silane can also be multi-functional or polymeric silanes, such as silane modified polybutadiene, or silane modified polyamine, etc.

Examples of organofunctional silane include 3-glycidoxypropyltrimethoxysilane, 3-aminopropyltriethoxysilane, aminopropylsilanetriol, (triethoxysilyl)propylsuccinic anhydride, 3-mercaptopropyltrimethoxysilane, vinyltrimethoxysilane, 3-methacryloxypropyltrimethoxysilane, 3-trihydroxysilyl-1-propane sulfonic acid, octyltriethyoxysilane, bis(triethoxysilyl)octane, etc. The examples are used to illustrate the invention and should not be regarded as conclusive.

A particularly preferred organofunctional silane is glycidyl silane defined by the formula:

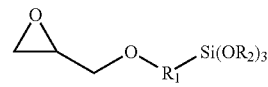

wherein $R_1$ is an alkyl of 1 to 14 carbons and more preferably selected from methyl ethyl and propyl; and each $R_2$ is independently an alkyl or substituted alkyl of 1 to 6 carbons.

A particularly preferred glycidyl silane is 3-glycidoxypropyltrimethoxysilane defined by the formula:

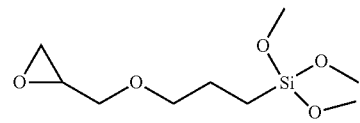

which is referred to herein as "Silane A" for convenience.

The second crosslinker, which is an organic compound with at least two functional groups selected from epoxy and carboxylic acid, has a concentration preferred range from about 0.1 wt % to about 10 wt % of the conductive polymer dispersion at a percents solids of about 0.2 to about 10 wt %. More preferably, the glycidyl ether concentration may range from about 0.2 wt % to about 5 wt % of the conductive polymer and even more preferably about 0.2 wt % to about 2 wt %.

The second crosslinker with at least two epoxy groups is referred to herein as an epoxy crosslinking compound and is defined by the formula:

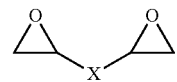

wherein the X is an alkyl or substituted alkyl of 0-14 carbons, preferably 0-6 carbons; an aryl or substituted aryl, an ethylene ether or substituted ethylene ether, polyethylene ether or substituted polyethylene ether with 2-20 ethylene ether groups or combinations thereof. A particularly preferred substitute is an epoxy group.

Examples of epoxy crosslinking compounds having more than one epoxy groups include ethylene glycol diglycidyl ether (EGDGE), propylene glycol diglycidyl ether (PGDGE), 1,4-butanediol diglycidyl ether (BDDGE), pentylene glycol diglycidyl ether, hexylene glycol diglycidyl ether, cyclohexane dimethanol diglycidyl ether, resorcinol glycidyl ether, glycerol diglycidyl ether (GDGE), glycerol polyglycidyl ethers, diglycerol polyglycidyl ethers, trimethylolpropane polyglycidyl ethers, sorbitol diglycidyl ether (Sorbitol-DGE), sorbitol polyglycidyl ethers, polyethylene glycol diglycidyl ether (PEGDGE), polypropylene glycol diglycidyl ether, polytetramethylene glycol diglycidyl ether, di(2,3-epoxypropyl) ether, 1,3-butadiene diepoxide, 1,5-hexadiene diepoxide, 1,2,7,8-diepoxyoctane, 1,2,5,6-diepoxycyclooctane, 4-vinyl cyclohexene diepoxide, bisphenol A diglycidyl ether, maleimide-epoxy compounds, etc.

A preferred epoxy crosslinking compound is glycidyl ether, defined by the formula:

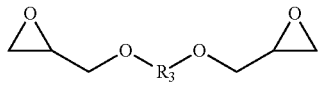

wherein $R_3$ is an alkyl or substituted alkyl of 1-14 carbons, preferably 2-6 carbons; an ethylene ether or polyethylene ether with 2-20 ethylene ether groups; a alkyl substituted with a group selected from hydroxy, or

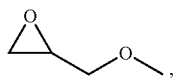

or
—$(CH_2OH)_xCH_2OH$ wherein X is 1 to 14.

Particularly preferred glycidyl ethers are represented by:

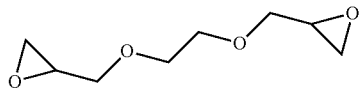 [SMILES: C(COCC1CO1)OCC1CO1]

EGDGE: ethylene glycol diglycidyl ether

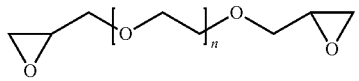

where n is an integer of 1 to 220;

PEGDGE: polyethylene glycol diglycidyl ether

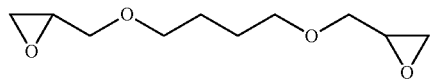 [SMILES: C(CCOCC1CO1)COCC1CO1]

BDDGE: 1,4-butanediol diglycidyl ether

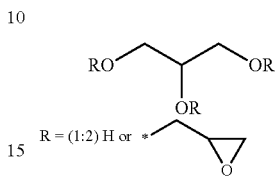

GDGE: glycerol diglycidyl ether

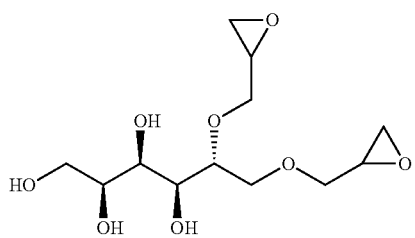 [SMILES: OC[C@H](O)[C@@H](O)[C@H](O)[C@@H](COCC1CO1)OCC1CO1]

Sorbitol-DGE: sorbitol diglycidyl ether

The organic compound with at least two carboxylic functional groups is referred to herein as a carboxylic crosslinking compound.

Examples of carboxylic crosslinking compounds include but are not limited by, oxalic acid, malonic acid, succinic acid, glutaric acid, adipic acid, pimelic acid, suberic acid, azelaic acid, sebacic acid, dodecanedioic acid, phthalic acids, maleic acid, muconic acid, citric acid, trimesic acid, polyacrylic acid, etc. Particularly preferred organic acids are aromatic acid such as phthalic acid, and particularly ortho-phthalic acid, which decreases ESR.

EXAMPLES

Example 1

An anodic foil would be prepared from porous aluminum film with an anodic oxide thereon. A cathodic foil would be prepared from a porous aluminum film. Each foil would be provided with a contact wire and would be wound with two separator papers and fixed with an adhesive tape. The oxidized electrode foil would be immersed in a solid electrolyte dispersion comprising PEDOT:PSSA and an additive with an epoxy functional group. This would be followed by drying at 125° C. for 30 min. Immersion and drying would be repeated several times. The capacitors would then be immersed in a solution comprising an inventive impregnating electrolyte comprising an additive with a carboxylic reactive group. This would be followed by drying at 125° C. for 30 min.

Example 2

An anodic foil would be prepared from porous aluminum film formed with anodic oxide. A cathodic foil would be prepared from a porous aluminum film. Each foil would be provided with a contact wire and would be wound with two separator papers and fixed with an adhesive tape. The materials used would be similar to Example 1 except the order of immersion would be reversed in this example. The oxidized electrode foil would be immersed in a solution comprising inventive impregnating electrolyte comprising an additive with a carboxylic reactive group. This would be followed by partially drying at 85° C. for 30 min. The capacitors would then be immersed in the solid electrolyte dispersion comprising PEDOT:PSSA and an additive with an epoxy functional group. This would be followed by drying at 125° C. for 30 min. Immersion and drying would be repeated several times.

Example 3

An anodic foil would be prepared from porous aluminum film with an anodic oxide thereon. A cathodic foil would be prepared from a porous aluminum film. Each foil would be provided with a contact wire and would be wound with two separator papers. The oxidized electrode foil would be immersed in a solid electrolyte dispersion comprising PEDOT and an additive with carboxylic functional group. This would be followed by drying at 125° C. for 30 min. The capacitors would then be immersed in a solution comprising inventive impregnating electrolyte comprising hyperbranched polyol with a hydroxy reactive group, ethyldimethyl aminophthalate, gamma butyrolactone and sulfolane. This would be followed by drying at 125° C. for 30 min. Immersion and drying of solid electrolyte and impregnating electrolyte would be repeated several times.

Example 4

An anodic foil would be prepared from porous aluminum film formed with anodic oxide. A cathodic foil would be prepared from a porous aluminum film. Each foil would be each provided with a contact wire and then would be wound with two separator papers. The oxidized electrode foil would be immersed in a mixture of solid electrolyte dispersion comprising PEDOT:Polyanion and additive with an epoxy functional group and impregnating electrolyte comprising ethyldimethyl amine salt phthalate, γ-butyro lactone, sulfolane, polyethylene glycol with a hydroxyl functional. This would be followed by drying at 125° C. for 30 min. Immersion and drying would be repeated several times.

Example 5

A series of porous tantalum anodes would be anodized. The oxidized anodes would be immersed in a solid electrolyte dispersion comprising PEDOT:PSSA and an additive with an epoxy functional group. This would be followed by drying at 125° C. for 30 min. Immersion and drying would be repeated several times. The capacitors would then be immersed in a solution comprising inventive impregnating electrolyte comprising an additive with a hydroxy reactive group. This would be followed by drying at 125° C. for 30. Immersion and drying would be repeated several times.

The invention has been described with reference to the preferred embodiments without limit thereto. Those of skill in the art would realize additional improvements and embodiments which are not specifically stated but which are within the scope of the invention as more specifically set forth in the claims appended hereto.

The invention claimed is:

1. A hybrid capacitor comprising:
   an anode with a dielectric thereon;
   a cathode; and
   an electrolyte in electrical contact with said cathode and between said cathode and said dielectric wherein said electrolyte comprises:
   a solid electrolyte coated on said cathode; and
   an impregnating electrolyte wherein said solid electrolyte and said impregnating electrolyte have an intermolecular bond there between.

2. The hybrid capacitor of claim 1 wherein said anode is an anode foil.

3. The hybrid capacitor of claim 1 wherein said anode comprises a metal.

4. The hybrid capacitor of claim 3 wherein said metal is a valve metal.

5. The hybrid capacitor of claim 4 wherein said valve metal is selected from the group consisting of tantalum, aluminum, niobium, titanium, zirconium, hafnium, and conductive a oxide thereof.

6. The hybrid capacitor of claim 1 wherein said cathode is a cathode foil.

7. The hybrid capacitor of claim 1 wherein said cathode comprises a metal.

8. The hybrid capacitor of claim 1 wherein said solid electrolyte comprises a material selected from the group consisting of manganese dioxide and a conductive polymer.

9. The hybrid capacitor of claim 8 wherein said conductive polymer has a particle size of no more than 100 nm.

10. The hybrid capacitor of claim 9 wherein said conductive polymer has a particle size of at least 0.5 nm.

11. The hybrid capacitor of claim 10 wherein said conductive polymer has a particle size of at least 2 nm to no more than 20 nm.

12. The hybrid capacitor of claim 8 wherein said conductive polymer is a polythiophene.

13. The hybrid capacitor of claim 12 wherein said polythiophene is 3,4-polyethylene dioxythiophene.

14. The hybrid capacitor of claim 1 wherein at least one of said solid electrolyte or said impregnating electrolyte further comprises at least one additive.

15. The hybrid capacitor of claim 14 wherein said additive is selected from the group consisting of fibers, dopants, binders, crosslinkers, and nanoparticles.

16. The hybrid capacitor of claim 15 wherein said fibers comprise polymers selected from the group consisting of polyacrylonitrile, cellulose, polyethylene oxide, polymethylmethacrylate, polyimide, polyaniline and polyvinyl alcohol.

17. The hybrid capacitor of claim 15 wherein said a fibers are nanofibers selected from cellulose nanofibers or nanofibers electrospun from conducting polymers.

18. The hybrid capacitor of claim 17 wherein said conducting polymers are selected from polyaniline, polythiophene and polypyrrole.

19. The hybrid capacitor of claim 15 wherein said a fibers have a length of no more than 100 nm and a diameter of no more than 50 nm.

20. The hybrid capacitor of claim 15 wherein said dopants are selected from the group consisting of aromatic sulfonic acids, aromatic polysulfonic acids, organic sulfonic acids with hydroxy groups, organic sulfonic acids with carboxyl-hydroxyl groups, alicyclic sulfonic acids, benzoquinone sulfonic acids, benzene disulfonic acids, sulfosalicylic acids, sulfoisophthalic acids, camphorsulfonic acids, benzoquinone sulfonic acids, dodecylbenzenesulfonic acids, toluenesulfonic acids, sulfoquinones, anthracenemonosulfonic acids, substituted naphthalenemonosulfonic acids, substituted benzenesulfonic acids and heterocyclic sulfonic acids.

21. The hybrid capacitor of claim 15 wherein said binders are selected from the binders are selected from the group consisting of polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid esters, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides and polysulphones.

22. The hybrid capacitor of claim 15 wherein said cross-linkers are selected from the group consisting of melamines, glycidyl ether, phenolic, blocked isocyanates and functional silanes.

23. The hybrid capacitor of claim 22 wherein said cross-linkers are selected from the group consisting of ethylene glycol diglycidyl ether (EGDGE), propylene glycol diglycidyl ether (PGDGE), 1,4-butanediol diglycidyl ether (BDDGE), resorcinol glycidyl ether, glycerol diglycidyl ether (GDGE), 3-glycidoxypropyltrialkoxysilane, tetraethoxysilane and tetraethoxysilane.

24. The hybrid capacitor of claim 15 wherein said nanoparticles are functionalized nanoparticles.

25. The hybrid capacitor of claim 14 wherein said intermolecular bond is between a reactive group of said additive and a reactive group of said impregnating electrolyte.

26. The hybrid capacitor of claim 25 wherein said reactive group of said additive is selected from the group consisting of epoxy, hydroxyl, amino, carboxylic, urethane, phosphate, silane, isocyanate, cyanate, nitro, peroxy, phosphio, phosphono, sulfonic acid, sulfone, nitro, acrylate, imide, amide, carboxyl, carboxylic anhydride, silane, oxazoline, (meth)acrylates, vinyls, maleates and maleimides itaconates, allyl alcohol esters, dicyclo-pentadiene-based unsaturations, unsaturated $C_{12}$-$C_{22}$ fatty esters or amides, carboxylic acid salts and quaternary ammonium salts.

27. The hybrid capacitor of claim 25 wherein said reactive group of said impregnating electrolyte is selected from the group consisting of epoxy, hydroxyl, amino, carboxylic, urethane, phosphate, silane, isocyanate, cyanate, nitro, peroxy, phosphio, phosphono, sulfonic acid, sulfone, nitro, acrylate, imide, amide, carboxyl, carboxylic anhydride, silane, oxazoline, (meth)acrylates, vinyls, maleates and maleimides itaconates, allyl alcohol esters, dicyclo-pentadiene-based unsaturations, unsaturated $C_{12}$-$C_{22}$ fatty esters or amides, carboxylic acid salts and quaternary ammonium salts.

28. The hybrid capacitor of claim 1 wherein said impregnating electrolyte comprises a material selected from electrolytes, solvents, cations, organic salts and anions.

29. The hybrid capacitor of claim 28 wherein said intermolecular bond is between said solid electrolyte and one of an electrolyte of said electrolytes, a solvent of said solvents, a cation of said cations, an organic salt of said organic salts or an anion of said anions.

30. The hybrid capacitor of claim 28 wherein said impregnating electrolyte comprises a material selected from the group consisting of ethers, amides, oxazolidinones, nitriles, glycols, glymes, glycerols, lactones, carbonates, sulfones or polyols.

31. The hybrid capacitor of claim 28 wherein said impregnating electrolyte comprises a material selected from the group consisting of polyols, glycerines, polyethylene glycols, poly(ethylene glycol) diacrylates, tetramethyl ammonium phthalates, γ-butyrolactones, ethylated γ-butyrolactones, propylated γ-butyrolactones, and β-propiolactones, dimethoxyethanes, diethylene glycol dimethyl ethers, triethylene glycol dimethyl ethers, ethylene glycol diethyl ethers, diethylene glycol diethyl ethers, polyethylene glycol dimethyl ethers, hyperbranched polyglycidol, hyperbranched polyalkylene glycols, poly(allyl glycidyl ether), poly(ethoxy ethyl glycidyl ether), copolymers of methyl glycidyl ether and allyl glycidyl ether, copolymers of methyl glycidyl ether and n-butyl glycidyl ether, hyperbranched copolymers comprising polymerizing glycidol of glycidyl ether monomer, poly(ethylene glycol) methyl ether acrylate, methoxypolyethylene glycol amine, O-(carboxymethyl)-O'-methylpolyethylene glycol, methoxy poly(ethylene glycol), polyethylene glycol monomethyl ether, methoxypolyethylene glycol maleimide, and poly(ethylene glycol) methyl ether methacrylate.

32. The hybrid capacitor of claim 28 wherein said solvents are selected from non-aqueous solvents and aprotic solvents.

33. The hybrid capacitor of claim 28 wherein said solvents have a boiling point of higher than 200° C. and a dielectric constant of higher than 35.

34. The hybrid capacitor of claim 28 wherein said solvents are selected from gamma-butyrolactone, sulfolane, 1,3-dimethyl-2-imidazolidinone, dimethyl sulfoxide, toluene, xylene and paraffin solvents.

35. The hybrid capacitor of claim 28 wherein said anions are selected from the group consisting of carboxylic acids, phenols, mono-alkyl phosphates containing $C_{1-15}$ alkyl, di-alkyl phosphates containing $C_{1-15}$ alkyl, sulfonic acids and inorganic acids.

36. The hybrid capacitor of claim 28 wherein said cations are defined by Formula II:

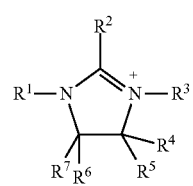

Formula II wherein $R^1$ to $R^3$ are each $C_{1-3}$ alkyl, and $R^4$ to $R^7$ are each $C_{1-3}$ alkyl or a hydrogen atom.

37. The hybrid capacitor of claim 36 wherein said $C_{1-3}$ is selected from the group consisting of methyl, ethyl, n-propyl and isopropyl.

38. The hybrid capacitor of claim 36 wherein said cations are selected from the group consisting of 1,2,3,4-tetramethylimidazolinium; 1,3,4-trimethyl-2-ethylimidazolinium; 1,3-dimethyl-2,4-diethylimidazolinium; 1,2-dimethyl-3,4-diethylimidazolinium; 1-methyl-2,3,4-triethylimidazolinium; 1,2,3,4-tetraethyl-imidazolinium; 1,2,3-triethylimidazolinium; 1,3-dimethyl-2-ethylimidazolinium; 1-ethyl-2,3-dimethylimidazolinium and 1,2,3-triethylimidazolinium.

39. The hybrid capacitor of claim 28 wherein said organic salts are selected from triethylamine borodisalicylate, ethyldimethylamine phthalate, mono 1,2,3,4-tetramethylimidazolinium phthalate and mono 1,3-dimethyl-2-ethylimidazolinium phthalate.

40. The hybrid capacitor of claim 1 further comprising a separator between said cathode and said anode with said electrolyte extending through said separator.

41. The hybrid capacitor of claim 1 wherein said intermolecular bond is a covalent bond.

42. A method of forming a hybrid capacitor comprising:
forming a dielectric on an anode foil;
forming a wound electrolytic capacitor comprising alternating layers of said anode foil, a cathode foil and a separator between said anode foil and said cathode foil;
forming a solid electrolyte layer on said cathode;
impregnating said solid electrolyte layer with an impregnating electrolyte; and
forming a intermolecular bond between said impregnating electrolyte and said solid electrolyte layer.

43. The method of forming a hybrid capacitor of claim 42 wherein said anode foil comprises a metal.

44. The method of forming a hybrid capacitor of claim 43 wherein said metal is a valve metal.

45. The method of forming a hybrid capacitor of claim 44 wherein said valve metal is selected from the group consisting of tantalum, aluminum, niobium, titanium, zirconium, hafnium, and conductive a oxide thereof.

46. The method of forming a hybrid capacitor of claim 42 wherein said cathode foil comprises a metal.

47. The method of forming a hybrid capacitor of claim 42 wherein said solid electrolyte comprises a material selected from the group consisting of manganese dioxide and a conductive polymer.

48. The method of forming a hybrid capacitor of claim 47 wherein said forming of said solid electrolyte layer comprises applying a dispersion of conductive polymer in a solvent to said cathode.

49. The method of forming a hybrid capacitor of claim 48 wherein said conductive polymer has a particle size of no more than 100 nm.

50. The method of forming a hybrid capacitor of claim 49 wherein said conductive polymer has a particle size of at least 0.5 nm.

51. The method of forming a hybrid capacitor of claim 47 wherein said conductive polymer has a particle size of at least 2 nm to no more than 20 nm.

52. The method of forming a hybrid capacitor of claim 51 further comprising removing said solvent.

53. The method of forming a hybrid capacitor of claim 47 wherein said conductive polymer is a polythiophene.

54. The method of forming a hybrid capacitor of claim 53 wherein said polythiophene is 3,4-polyethylene dioxythiophene.

55. The method of forming a hybrid capacitor of claim 42 wherein at least one of said solid electrolyte or said impregnating electrolyte further comprises at least one additive.

56. The method of forming a hybrid capacitor of claim 55 wherein said additive is selected from the group consisting of fibers, dopants, crosslinkers, nanoparticles and binders.

57. The method of forming a hybrid capacitor of claim 56 wherein said fibers comprise polymers selected from the group consisting of polyacrylonitrile, cellulose, polyethylene oxide, polymethylmethacrylate, polyimide, polyaniline and polyvinyl alcohol.

58. The method of forming a hybrid capacitor of claim 56 wherein said fibers are nanofibers selected from cellulose nanofibers or nanofibers electrospun from conducting polymers.

59. The method of forming a hybrid capacitor of claim 58 wherein said conducting polymers are selected from polyaniline, polythiophene and polypyrrole.

60. The method of forming a hybrid capacitor of claim 56 wherein said a fibers have a length of no more than 100 nm and a diameter of no more than 50 nm.

61. The method of forming a hybrid capacitor of claim 56 wherein said dopants are selected from the group consisting of aromatic sulfonic acids, aromatic polysulfonic acids, organic sulfonic acids with hydroxy groups, organic sulfonic acids with carboxylhydroxyl groups, alicyclic sulfonic acids, benzoquinone sulfonic acids, benzene disulfonic acids, sulfosalicylic acids, sulfoisophthalic acids, camphorsulfonic acids, benzoquinone sulfonic acids, dodecylbenzenesulfonic acids, toluenesulfonic acids, sulfoquinones, anthracenemonosulfonic acids, substituted naphthalenemonosulfonic acids, substituted benzenesulfonic acids and heterocyclic sulfonic acids.

62. The method of forming a hybrid capacitor of claim 56 wherein said binders are selected from the group consisting of polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid esters, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides and polysulphones.

63. The method of forming a hybrid capacitor of claim 56 wherein said crosslinkers are selected from the group consisting of melamines, glycidyl ether, phenolic, blocked isocyanates and functional silanes.

64. The method of forming a hybrid capacitor of claim 63 wherein said crosslinkers are selected from the group consisting of ethylene glycol diglycidyl ether (EGDGE), propylene glycol diglycidyl ether (PGDGE), 1,4-butanediol diglycidyl ether (BDDGE), resorcinol glycidyl ether, glycerol diglycidyl ether (GDGE), 3-glycidoxypropyltrialkoxysilane, tetraethoxysilane and tetraethoxysilane.

65. The method of forming a hybrid capacitor of claim 56 wherein said nanoparticles are functionalized nanoparticles.

66. The method of forming a hybrid capacitor of claim 55 wherein said intermolecular bond is between a reactive group of said additive and a reactive group of said impregnating electrolyte.

67. The method of forming a hybrid capacitor of claim 66 wherein said reactive group of said additive is selected from the group consisting of epoxy, hydroxyl, amino, carboxylic, urethane, phosphate, silane, isocyanate, cyanate, nitro, peroxy, phosphio, phosphono, sulfonic acid, sulfone, nitro, acrylate, imide, amide, carboxyl, carboxylic anhydride, silane, oxazoline, (meth)acrylates, vinyls, maleates and maleimides itaconates, allyl alcohol esters, dicyclo-pentadiene-based unsaturations, unsaturated $C_{12}$-$C_{22}$ fatty esters or amides, carboxylic acid salts and quaternary ammonium salts.

68. The method of forming a hybrid capacitor of claim 66 wherein said reactive group of said impregnating electrolyte is selected from the group consisting of epoxy, hydroxyl, amino, carboxylic, urethane, phosphate, silane, isocyanate, cyanate, nitro, peroxy, phosphio, phosphono, sulfonic acid, sulfone, nitro, acrylate, imide, amide, carboxyl, carboxylic anhydride, silane, oxazoline, (meth)acrylates, vinyls, maleates and maleimides itaconates, allyl alcohol esters, dicyclo-pentadiene-based unsaturations, unsaturated $C_{12}$-$C_{22}$ fatty esters or amides, carboxylic acid salts and quaternary ammonium salts.

69. The method of forming a hybrid capacitor of claim 42 wherein said impregnating electrolyte comprises a material selected from the group consisting of ethers, amides, oxazolidinones, nitriles, glycols, glymes, glycerols, lactones, carbonates, sulfones or polyols.

70. The method of forming a hybrid capacitor of claim 42 wherein said impregnating electrolyte comprises a material selected from the group consisting of polyols, glycerines, polyethylene glycols, poly(ethylene glycol) diacrylates, tetramethyl ammonium phthalates, γ-butyrolactones, ethylated γ-butyrolactones, propylated γ-butyrolactones, and β-propiolactones, dimethoxyethanes, diethylene glycol dimethyl ethers, triethylene glycol dimethyl ethers, ethylene glycol diethyl ethers, diethylene glycol diethyl ethers, polyethylene glycol dimethyl ethers, hyperbranched polyglycidol, hyperbranched polyalkylene glycols, poly(allyl glycidyl ether), poly(ethoxy ethyl glycidyl ether), copolymers of methyl glycidyl ether and allyl glycidyl ether, copolymers of methyl glycidyl ether and n-butyl glycidyl ether, hyperbranched copolymers comprising polymerizing glycidol of glycidyl ether monomer, poly(ethylene glycol) methyl ether acrylate, methoxypolyethylene glycol amine, O-(carboxymethyl)-O'-methylpolyethylene glycol, methoxy poly(ethylene glycol), polyethylene glycol monomethyl ether, methoxypolyethylene glycol maleimide, and poly(ethylene glycol) methyl ether methacrylate.

71. The method of forming a hybrid capacitor of claim 42 wherein said impregnating electrolyte comprises a material selected from electrolytes, solvents, cations, organic salts and anions.

72. The hybrid capacitor of claim 71 wherein said intermolecular bond is between said solid electrolyte and one of an electrolyte of said electrolytes, a solvent of said solvents, a cation of said cations, an organic salt of said organic salts or an anion of said anions.

73. The method of forming a hybrid capacitor of claim 71 wherein said solvents are selected from non-aqueous solvents and aprotic solvents.

74. The method of forming a hybrid capacitor of claim 71 wherein said solvents have a boiling point of higher than 200° C. and a dielectric constant of higher than 35.

75. The method of forming a hybrid capacitor of claim 71 wherein said solvents are selected from gamma-butyrolactone, sulfolane, 1,3-dimethyl-2-imidazolidinone, dimethyl sulfoxide, toluene, xylene and paraffin solvents.

76. The method of forming a hybrid capacitor of claim 71 wherein said anions are selected from the group consisting of carboxylic acids, phenols, mono-alkyl phosphates containing $C_{1-15}$ alkyl, di-alkyl phosphates containing $C_{1-15}$ alkyl, sulfonic acids and inorganic acids.

77. The method of forming a hybrid capacitor of claim 71 wherein said cations are defined by Formula II:

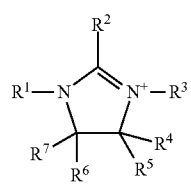

Formula II wherein $R^1$ to $R^3$ are each $C_{1-3}$ alkyl, and $R^4$ to $R^7$ are each $C_{1-3}$ alkyl or a hydrogen atom.

78. The method of forming a hybrid capacitor of claim 77 wherein said $C_{1-3}$ is selected from the group consisting of methyl, ethyl, n-propyl and isopropyl.

79. The method of forming a hybrid capacitor of claim 77 wherein said cations are selected from the group consisting of 1,2,3,4-tetramethylimidazolinium; 1,3,4-trimethyl-2-ethylimidazolinium; 1,3-dimethyl-2,4-diethylimidazolinium; 1,2-dimethyl-3,4-diethylimidazolinium: 1-methyl-2,3,4-triethylimidazolinium; 1,2,3,4-tetraethyl-imidazolinium; 1,2,3-trimethylimidazolinium; 1,3-dimethyl-2-ethylimidazolinium; 1-ethyl-2,3-dimethylimidazolinium and 1,2,3-triethylimidazolinium.

80. The method of forming a hybrid capacitor of claim 71 wherein said organic salts are selected from triethylamine borodisalicylate, ethyldimethylamine phthalate, mono 1,2,3,4-tetramethylimidazolinium phthalate and mono 1,3-dimethyl-2-ethylimidazolinium phthalate.

81. The method of forming a hybrid capacitor of claim 42 wherein said forming said intermolecular bond comprises crosslinking a reactive group of said solid electrolyte with a reactive group of said impregnating electrolyte by a crosslinker.

82. The method of forming a hybrid capacitor of claim 81 wherein said crosslinker is selected from the group consisting of silanes, epoxides, ethers, epoxy crosslinkers, carboxylic crosslinking compounds and hydrophilic coupling agents.

83. The method of forming a hybrid capacitor of claim 82 wherein said carboxylic crosslinking compounds are selected from the group consisting of oxalic acid, malonic acid, succinic acid, glutaric acid, adipic acid, pimelic acid, suberic acid, azelaic acid, sebacic acid, dodecanedioic acid, phthalic acids, maleic acid, muconic acid, citric acid, trimesic acid and polyacrylic acid.

84. The method of forming a hybrid capacitor of claim 42 wherein said intermolecular bond is a covalent bond.

85. A method of forming a hybrid capacitor comprising:
forming a dielectric on an anode;
forming a solid electrolyte layer on said dielectric;
impregnating said solid electrolyte layer with an impregnating electrolyte forming an impregnated solid electrolyte;
forming a cathode on said impregnated solid electrolyte; and
forming an intermolecular bond between said impregnating electrolyte and said solid electrolyte layer.

86. The method for forming a hybrid capacitor of claim 85 wherein said impregnating is after said forming of said cathode.

87. The method of forming a hybrid capacitor of claim 85 wherein said anode is an anode foil.

88. The method of forming a hybrid capacitor of claim 85 wherein said anode comprises a metal.

89. The method of forming a hybrid capacitor of claim 88 wherein said metal is a valve metal.

90. The method of forming a hybrid capacitor of claim 89 wherein said valve metal is selected from the group consisting of tantalum, aluminum, niobium, titanium, zirconium, hafnium, and conductive a oxide thereof.

91. The method of forming a hybrid capacitor of claim 85 wherein said cathode is a cathode foil.

92. The method of forming a hybrid capacitor of claim 85 wherein said cathode comprises a metal.

93. The method of forming a hybrid capacitor of claim 85 wherein said solid electrolyte comprises a material selected from the group consisting of manganese dioxide and a conductive polymer.

94. The method of forming a hybrid capacitor of claim 93 wherein said conductive polymer has a particle size of no more than 100 nm.

95. The method of forming a hybrid capacitor of claim 94 wherein said conductive polymer has a particle size of at least 0.5 nm.

96. The method of forming a hybrid capacitor of claim 95 wherein said conductive polymer has a particle size of at least 2 nm to no more than 20 nm.

97. The method of forming a hybrid capacitor of claim 93 wherein said conductive polymer is a polythiophene.

98. The method of forming a hybrid capacitor of claim 97 wherein said polythiophene is 3,4-polyethylene dioxythiophene.

99. The method of forming a hybrid capacitor of claim 85 wherein at least one of said solid electrolyte or said impregnating electrolyte further comprises at least one additive.

100. The method of forming a hybrid capacitor of claim 99 wherein said additive is selected from the group consisting of fibers, dopants, crosslinker, nanoparticles and binders.

101. The method of forming a hybrid capacitor of claim 100 wherein said fibers comprise polymers selected from the group consisting of polyacrylonitrile, cellulose, polyethylene oxide, polymethylmethacrylate, polyimide, polyaniline and polyvinyl alcohol.

102. The method of forming a hybrid capacitor of claim 100 wherein said a fibers are nanofibers selected from cellulose nanofibers or nanofibers electrospun from conducting polymers.

103. The method of forming a hybrid capacitor of claim 102 wherein said conducting polymers are selected from polyaniline, polythiophene and polypyrrole.

104. The method of forming a hybrid capacitor of claim 100 wherein said a fibers have a length of no more than 100 nm and a diameter of no more than 50 nm.

105. The method of forming a hybrid capacitor of claim 100 wherein said dopants are selected from the group consisting of aromatic sulfonic acids, aromatic polysulfonic acids, organic sulfonic acids with hydroxy groups, organic sulfonic acids with carboxylhydroxyl groups, alicyclic sulfonic acids, benzoquinone sulfonic acids, benzene disulfonic acids, sulfosalicylic acids, sulfoisophthalic acids, camphorsulfonic acids, benzoquinone sulfonic acids, dodecylbenzenesulfonic acids, toluenesulfonic acids, sulfoquinones, anthracenemonosulfonic acids, substituted naphthalenemonosulfonic acids, substituted benzenesulfonic acids and heterocyclic sulfonic acids.

106. The method of forming a hybrid capacitor of claim 100 wherein said binders are selected from the group consisting of polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid esters, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulphones.

107. The method of forming a hybrid capacitor of claim 100 wherein said crosslinkers are selected from the group consisting of melamines, glycidyl ether, phenolic, blocked isocyanates and functional silanes.

108. The method of forming a hybrid capacitor of claim 107 a wherein said crosslinkers are selected from the group consisting of ethylene glycol diglycidyl ether (EGDGE), propylene glycol diglycidyl ether (PGDGE), 1,4-butanediol diglycidyl ether (BDDGE), resorcinol glycidyl ether, glycerol diglycidyl ether (GDGE), 3-glycidoxypropyltrialkoxysilane, tetraethoxysilane and tetraethoxysilane.

109. The method of forming a hybrid capacitor of claim 100 wherein said nanoparticles are functionalized nanoparticles.

110. The method of forming a hybrid capacitor of claim 99 wherein said intermolecular bond is between a reactive group of said additive and a reactive group of said impregnating electrolyte.

111. The method of forming a hybrid capacitor of claim 110 wherein said reactive group of said additive is selected from the group consisting of epoxy, hydroxyl, amino, carboxylic, urethane, phosphate, silane, isocyanate, cyanate, nitro, peroxy, phosphio, phosphono, sulfonic acid, sulfone, nitro, acrylate, imide, amide, carboxyl, carboxylic anhydride, silane, oxazoline, (meth)acrylates, vinyls, maleates and maleimides itaconates, allyl alcohol esters, dicyclopentadiene-based unsaturations, unsaturated $C_{12}$-$C_{22}$ fatty esters or amides, carboxylic acid salts and quaternary ammonium salts.

112. The method of forming a hybrid capacitor of claim 110 wherein said reactive group of said impregnating electrolyte is selected from the group consisting of epoxy, hydroxyl, amino, carboxylic, urethane, phosphate, silane, isocyanate, cyanate, nitro, peroxy, phosphio, phosphono, sulfonic acid, sulfone, nitro, acrylate, imide, amide, carboxyl, carboxylic anhydride, silane, oxazoline, (meth)acrylates, vinyls, maleates and maleimides itaconates, allyl alcohol esters, dicyclo-pentadiene-based unsaturations, unsaturated $C_{12}$-$C_{22}$ fatty esters or amides, carboxylic acid salts and quaternary ammonium salts.

113. The method of forming a hybrid capacitor of claim 85 wherein said impregnating electrolyte comprises a material selected from the group consisting of ethers, amides, oxazolidinones, nitriles, glycols, glymes, glycerols, lactones, carbonates, sulfones or polyols.

114. The method of forming a hybrid capacitor of claim 85 wherein said impregnating electrolyte comprises a material selected from the group consisting of polyols, glycerines, polyethylene glycols, poly(ethylene glycol) diacrylates, tetramethyl ammonium phthalates, γ-butyrolactones, ethylated γ-butyrolactones, propylated γ-butyrolactones, and β-propiolactones, dimethoxyethanes, diethylene glycol dimethyl ethers, triethylene glycol dimethyl ethers, ethylene glycol diethyl ethers, diethylene glycol diethyl ethers, polyethylene glycol dimethyl ethers, hyperbranched polyglycidol, hyperbranched polyalkylene glycols, poly(allyl glycidyl ether), poly(ethoxy ethyl glycidyl ether), copolymers of methyl glycidyl ether and allyl glycidyl ether, copolymers of methyl glycidyl ether and n-butyl glycidyl ether, hyperbranched copolymers comprising polymerizing glycidol of glycidyl ether monomer, poly(ethylene glycol) methyl ether acrylate, methoxypolyethylene glycol amine, O-(carboxymethyl)-O'-methylpolyethylene glycol, methoxy poly(ethylene glycol), polyethylene glycol monomethyl ether, methoxypolyethylene glycol maleimide, and poly(ethylene glycol) methyl ether methacrylate.

115. The method of forming a hybrid capacitor of claim 85 wherein said impregnating electrolyte comprises a material selected from electrolytes, solvents, cations, organic salts and anions.

116. The method of forming a hybrid capacitor of claim 115 wherein said intermolecular bond is between said solid electrolyte and one of an electrolyte of said electrolytes, a solvent of said solvents, a cation of said cations, an organic salt of said organic salts or an anion of said anions.

117. The method of forming a hybrid capacitor of claim 115 wherein said solvents are selected from non-aqueous solvents and aprotic solvents.

118. The method of forming a hybrid capacitor of claim 117 wherein said solvents are selected from gamma-butyrolactone, sulfolane, 1,3-dimethyl-2-imidazolidinone, dimethyl sulfoxide, toluene, xylene and paraffin solvents.

119. The method of forming a hybrid capacitor of claim 115 wherein said solvents have a boiling point of higher than 200° C. and a dielectric constant of higher than 35.

120. The method of forming a hybrid capacitor of claim 115 wherein said anions are selected from the group consisting of carboxylic acids, phenols, mono-alkyl phosphates containing $C_{1-15}$ alkyl, di-alkyl phosphates containing $C_{1-15}$ alkyl, sulfonic acids and inorganic acids.

121. The method of forming a hybrid capacitor of claim 115 wherein said cations are defined by Formula II:

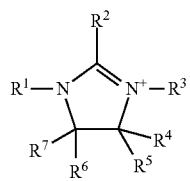

Formula II wherein $R^1$ to $R^3$ are each $C_{1-3}$ alkyl, and $R^4$ to $R^7$ are each $C_{1-3}$ alkyl or a hydrogen atom.

122. The method of forming a hybrid capacitor of claim 121 wherein said $C_{1-3}$ is selected from the group consisting of methyl, ethyl, n-propyl and isopropyl.

123. The method of forming a hybrid capacitor of claim 121 wherein said cations are selected from the group consisting of 1,2,3,4-tetramethylimidazolinium; 1,3,4-trimethyl-2-ethylimidazolinium; 1,3-dimethyl-2,4-diethylimidazolinium; 1,2-dimethyl-3,4-diethylimidazolinium; 1-methyl-2,3,4-triethylimidazolinium; 1,2,3,4-tetraethylimidazolinium; 1,2,3-trimethylimidazolinium; 1,3-dimethyl-2-ethylimidazolinium; 1-ethyl-2,3-dimethylimidazolinium and 1,2,3-triethylimidazolinium.

124. The method of forming a hybrid capacitor of claim 115 wherein said organic salts are selected from triethylamine borodisalicylate, ethyldimethylamine phthalate, mono 1,2,3,4-tetramethylimidazolinium phthalate and mono 1,3-dimethyl-2-ethylimidazolinium phthalate.

125. The method of forming a hybrid capacitor of claim 85 further comprising inserting a separator between said cathode and said dielectric.

126. The method of forming a hybrid capacitor of claim 85 wherein said forming said intermolecular bond comprises crosslinking a reactive group of said solid electrolyte with a reactive group of said impregnating electrolyte by a crosslinker.

127. The method of forming a hybrid capacitor of claim 126 wherein said crosslinker is selected from the group consisting of silanes, epoxides, ethers, epoxy crosslinkers, carboxylic crosslinking compounds and hydrophilic coupling agents.

128. The method of forming a hybrid capacitor of claim 127 wherein said carboxylic crosslinking compounds are selected from the group consisting of oxalic acid, malonic acid, succinic acid, glutaric acid, adipic acid, pimelic acid, suberic acid, azelaic acid, sebacic acid, dodecanedioic acid, phthalic acids, maleic acid, muconic acid, citric acid, trimesic acid and polyacrylic acid.

129. The method of forming a hybrid capacitor of claim 85 wherein said intermolecular bond is a covalent bond.

* * * * *